(12) United States Patent
Guo et al.

(10) Patent No.: US 12,105,017 B2
(45) Date of Patent: Oct. 1, 2024

(54) LASER OPTO-ULTRASONIC DUAL DETECTION METHOD AND DEVICE FOR DETECTING ELEMENTS, DEFECTS AND RESIDUAL STRESS SIMULTANEOUSLY

(71) Applicant: HUAZHONG UNIVERSITY OF SCIENCE AND TECHNOLOGY, Hubei (CN)

(72) Inventors: Lianbo Guo, Hubei (CN); Yuyang Ma, Hubei (CN); Zhenlin Hu, Hubei (CN); Xiujuan Hu, Hubei (CN); Weiliang Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 604 days.

(21) Appl. No.: 17/289,241

(22) PCT Filed: Dec. 16, 2019

(86) PCT No.: PCT/CN2019/125482
§ 371 (c)(1),
(2) Date: Apr. 28, 2021

(87) PCT Pub. No.: WO2020/135118
PCT Pub. Date: Jul. 2, 2020

(65) Prior Publication Data
US 2021/0396652 A1    Dec. 23, 2021

(30) Foreign Application Priority Data
Dec. 25, 2018    (CN) .......................... 201811589367.6

(51) Int. Cl.
*G01N 21/17* (2006.01)
*G01N 29/24* (2006.01)

(52) U.S. Cl.
CPC ..... *G01N 21/1702* (2013.01); *G01N 29/2418* (2013.01); *G01N 2021/1706* (2013.01); *G01N 2291/0423* (2013.01)

(58) Field of Classification Search
CPC ....................... G01N 21/1702; G01N 29/2418
See application file for complete search history.

(56) References Cited

U.S. PATENT DOCUMENTS 5,585,921 A * 12/1996 Pepper ................. G01N 29/075
356/432
5,748,318 A * 5/1998 Maris ................. G01N 29/0681
702/170

(Continued)

FOREIGN PATENT DOCUMENTS

CN         103412049 A  * 11/2013
CN         103674359       3/2014

(Continued)

OTHER PUBLICATIONS

Y. D. Shim, et al, "Acousto-Elastic Effect of Surface Acoustic Waves," paper presented on Nov. 16, 2017 at the 15th Asia Pacific Conference for Non-Destructive Testing (APCNDT2017), Singapore (Year: 2017).*

(Continued)

*Primary Examiner* — Edmond C Lau
*Assistant Examiner* — Chad Andrew Reverman
(74) *Attorney, Agent, or Firm* — JCIP GLOBAL INC.

(57) ABSTRACT

The disclosure discloses a laser opto-ultrasonic dual detection method and device using a pulse laser incident on the surface of a sample to generate plasma and the optical emission and ultrasonic waves are generated, to simultaneously analyze the element compositions, structural defects and residual stress of the sample. The detection system includes an excitation unit, a spectrum detection module, an ultrasonic detection module and an analysis control module.

(Continued)

The digital delayer generator is connected to the computer, the high-precision 3D displacement platform is electrically connected to the digital delayer generator. The the pulsed laser is focused on and incident onto the surface of the sample to be tested through modulation of the optical path system to generate plasma, which simultaneously generate optical emission and ultrasonic waves. The ultrasonic detection unit is configured to detect the ultrasonic waves. The spectrum detection unit is configured to detect the plasma emission spectrum.

12 Claims, 3 Drawing Sheets

(56) References Cited

U.S. PATENT DOCUMENTS

| | | | |
|---|---|---|---|
| 5,798,832 A | 8/1998 | Hnilica et al. | |
| 7,262,861 B1 * | 8/2007 | Pepper | G01B 17/02 356/502 |
| 10,094,782 B2 * | 10/2018 | Doucet | G01J 3/443 |
| 2003/0020923 A1 * | 1/2003 | Dubois | G01N 21/453 356/502 |
| 2003/0101007 A1 * | 5/2003 | Dubois | G01N 29/4418 702/39 |
| 2011/0036170 A1 | 2/2011 | Shekhawat et al. | |
| 2017/0167982 A1 * | 6/2017 | Doucet | G01N 21/718 |
| 2020/0134773 A1 * | 4/2020 | Pinter | G01N 21/8806 |

FOREIGN PATENT DOCUMENTS

| | | |
|---|---|---|
| CN | 107271370 | 10/2017 |
| CN | 107402044 | 11/2017 |
| CN | 107607520 | 1/2018 |
| CN | 108168747 | 6/2018 |
| CN | 207850927 | 9/2018 |

OTHER PUBLICATIONS

"International Search Report (Form PCT/ISA/210) of PCT/CN2019/125482," mailed on Mar. 18, 2020, pp. 1-6.

* cited by examiner

LASER OPTO-ULTRASONIC DUAL DETECTION METHOD AND DEVICE FOR DETECTING ELEMENTS, DEFECTS AND RESIDUAL STRESS SIMULTANEOUSLY

CROSS-REFERENCE TO RELATED APPLICATION

This application is a 371 of international application of PCT application serial no. PCT/CN2019/125482, filed on Dec. 16, 2019, which claims the priority benefit of China application no. 201811589367.6, filed on Dec. 25, 2018. The entirety of each of the abovementioned patent applications is hereby incorporated by reference herein and made a part of this specification.

BACKGROUND

Field of the Disclosure

The disclosure belongs to the field of laser material detection, and specifically is a multifunctional laser opto-ultrasonic detection approach and signal analysis method and device that detect element composition, structural defects and residual stress distribution through pulse laser excitation. Detection and analysis are carried out mainly through the light and acoustic signal generated after performing excitation on materials through pulse laser, thereby detecting elements, defects and residual stress of target simultaneously.

Description of Related Art

The development of new materials is an important driving force for the development of the industry, and the quality detection of the components made by the materials can ensure the safety, reliability and application of the components. Therefore, the manufacturing industry is in urgent need for high-precision and rapid detection of material components. At present, element content, structural defects and residual stress distribution are the three important aspects in physical and chemical properties detection for materials, and there are many methods for detecting element, defect and stress in the field of material component detection.

(1) In terms of element analysis, there are conventional detection methods including chemical methods, inductively coupled plasma optical emission spectrometer (ICP-OES), X-ray fluorescence (XRF), scanning electron microscopy-energy dispersive X-Ray Spectroscopy (SEM-EDS), etc. However, there are many shortcomings of above methods, such as destructive to samples, time-consuming, rigorous environmental requirements, etc., which cannot meet the requirement of in situ, fast speed, and micro-destructive or even nondestructive in element content detection. Therefore, a new element detection technology, Laser-Induced Breakdown Spectroscopy (LIBS), has been developed.

LIBS is a new kind of atomic emission spectroscopy analysis technology. The basic principle of the technology is to generate plasma by focusing a pulse laser onto the sample surface and ablating the sample surface, and acquiring the radiation spectrum of the plasma to perform element qualitative and quantitative analysis on the sample to obtain the type and content information of elements. Since LIBS is characterized in multi-element simultaneous real-time analysis, simple or no sample pretreatment, fast and micro-destructive detection, etc., LIBS technology has broad application prospects in the fields including metal metallurgy, aerospace, defense industry, and nuclear industry. Chinese patent document "On-line measuring system based on laser induction punctures spectrum" (publication no. CN207850927 U, publication date is Sep. 11, 2018) discloses an online measuring system based on laser induction punctures spectrum. The above patent application can detect the content of specific elements and obtain the properties of the sample in real time, rapidly and accurately, so as to guide the production of ingredients in time.

(2) In terms of non-destructive detection of structural defects, related technologies mainly include radiographic testing (RT), magnetic particle testing (MT), eddy current testing (ET), liquid penetration testing (PT) and ultrasonic testing (UT). Among them, RT, MT, ET, and PT technologies have high requirements for detecting environment, requiring pretreatment of the samples to be tested, and there are limitations in using the above technologies. Because ultrasonic testing can be performed without the limitations of the above methods, ultrasonic testing is currently the most advantageous detecting technology in the industrial field. Laser ultrasonic testing technology is a type of ultrasonic detecting technology, which has the advantages of non-destructive, non-contact and high precision.

Chinese patent document "Laser ultrasonic detection system and method based on detection of internal defects in materials" discloses a laser ultrasonic detection system and method based on detection of internal defects in materials. This patent can determine the location of internal defects through laser-excited ultrasonic waves and select the longitudinal wave propagation image at the moment to realize the visualized detection of internal defects of the material.

(3) In terms of residual stress detection, related technologies are mainly divided into destructive methods and non-destructive methods. The destructive methods mainly include the slicing method, the contour method, the blind-hole method and the cutting method, and the non-destructive methods mainly include the magnetic method, X-ray method, neutron diffraction method and ultrasonic method. Among them, the ultrasonic method is characterized in high resolution, high permeability and harmless to human body simultaneously, and is one of the most potential technologies in the development of residual stress detection.

Chinese disclosure patent document "Device and method for measuring residual stress on surface of work piece based on laser ultrasonic" (publication no. CN108168747 A, publication date is Jun. 18, 2018) discloses a device and method for measuring residual stress on surface of work piece based on laser ultrasonic. The method scans the pulse laser focused into a point source through a galvanometer to generate a surface wave on the surface of a workpiece, and receives and calculates the surface wave signal through a piezoelectric sensor, thereby realizing a nondestructive and rapid detection of the residual stress on the surface of the workpiece.

In conclusion, in the field of detection, although there are relatively mature technical methods for element, defect, and residual stress detection, for example, XRF technology can be adopted for element detection, the ultrasonic method can be adopted for defect detection, and blind-hole method can be adopted for residual stress detection. However, since the current detection methods adopted can only realize a single property detection in one aspect of the material, if a comprehensive and systematic detections is to be performed on metal samples, it is required to perform multiple detections by using multiple equipment, which takes a long time at high cost and the operation steps are complex. In particular, it should be pointed out that different detection methods have different requirements for sample preparation, which might not only cause serious destruction to the sample, but also be difficult to obtain multiple information of the sample in situ. The limitation of detection technologies seriously hinders the promotion and application of materials.

SUMMARY OF THE DISCLOSURE

Directing at the defects or needs of improvement of the prior art, the disclosure provides a method for simultaneously detecting elements, defects and residual stress of materials, which overcomes the shortcomings of the current detection technologies, that is, not capable of measuring elements, defects and residual stress simultaneously or at one time.

According to an aspect of the disclosure, a method is provided, which detects elements, defects and residual stress simultaneously, including the following steps.

S1: A high-energy pulse laser is adopted to ablate the surface of the target to generate plasma. The plasma expands and generates back punch on the surface of the target to excite ultrasonic waves, and the plasma spectrum is released at the same time.

S2: Ultrasonic signals and spectral signals are gathered. Specifically, ultrasonic signals are gathered in a wide frequency domain through an ultrasonic detector, plasma emission spectrum are gathered through an acquisition probe, and transmitted to the spectrometer and intensified charge-coupled device (ICCD) through optical fibers.

S3: The amplitude of the head wave in the ultrasonic signal is analyzed to determine whether there is a defect in the detection area, and the signal amplitude at the defect area is lower, which is used as the basis for detection.

By calculating the propagation time of ultrasonic wave, the velocity of sound is obtained. Based on acoustoelastic theory, the following is obtained.

$$\sigma = \frac{1}{K}\left(\frac{V_{IZ} - V_{lo}}{V_{lo}}\right)$$

Where the stress $\sigma$ of a substance is related to sound velocity change rate $$\frac{V_{IZ} - V_{lo}}{V_{lo}},$$

and the sound velocity change rate is obtained by comparing the stress sound velocity $V_{IZ}$ and the stressless sound velocity $V_{lo}$ at the measured area. The acoustic elasticity coefficient K is measured by stretching the sample, and the stress of the material is obtained by measuring the velocity of sound.

For the optical radiation signal of the plasma, the high-resolution spectrometer is adopted to perform light-splitting on the signal, and then the signal after light-splitting is subjected to photoelectrical conversion and analysis through highly sensitive ICCD, thereby obtaining atom-induced breakdown spectrum, and the wavelength information of the spectrum characterizes the element type of the substance.

The principle is that high-energy pulse laser is adopted to ablate the surface of the target, the material at the ablation area vaporizes, the atoms, molecules and other particles in the vaporized substance absorb energy and release ions, and the ions continue to absorb energy to form high-temperature and high-density plasma plume that contains atoms, molecules, ions and free electrons. The plasma plume absorbs laser energy and expands outwards, generating shock waves. The shock wave quickly expands and propagates to the surface of the sample, excites the phonons in the sample to vibrate, and generates high-frequency ultrasonic waves. In the meantime, the particles in the plasma absorb laser energy to produce electronic transitions and radiate photons with specific wavelengths and reflecting material information.

More specifically, the ultrasonic signal is gathered in a wide frequency domain through a high-sensitivity and wide frequency domain ultrasonic detector. After obtaining the ultrasonic signal, wavelet analysis is used to denoise the signal and carry out waveform distortion correction to improve the signal-to-noise ratio, and then the amplitude of the ultrasonic signal head wave is extracted to determine whether there is a defect in the detected area. By identifying the ultrasonic signal head wave and the first echo, the ultrasonic time-of-flight is calculated, and then the thickness of sample is measured, so that the ultrasound velocity is obtained. Based on acoustoelastic theory, the following is obtained.

$$\sigma = \frac{1}{K}\left(\frac{V_{IZ} - V_{lo}}{V_{lo}}\right)$$

Where the stress ($\sigma$) of a substance is related to sound velocity change rate $$\frac{V_{IZ} - V_{lo}}{V_{lo}},$$

and the sound velocity change rate is obtained by comparing the stress sound velocity $V_{IZ}$ and the stressless sound velocity $V_{lo}$ at the measured area. The acoustic elasticity coefficient K is measured by stretching the sample, and the stress of the material is obtained by measuring the velocity of sound.

For the optical signal of the plasma, the high-resolution spectrometer is adopted to perform light-splitting on the signal, and then the signal after light-splitting is subjected to photoelectrical conversion and imaging through highly sensitive ICCD, thereby obtaining laser-induced breakdown spectrum. Firstly, wavelet and other algorithms are adopted to denoise the spectrum. Then, the wavelength shift of the spectrum and the self-reversal of the spectrum caused by the self-absorption are calibrated to obtain the accurate wavelength information of the spectrum, so as to analyze the element type of the substance. The accurate spectrum intensity is obtained through spectral line fitting. Finally the content of elements corresponding to the excitation site is established through the calibration curve method.

Further, surface scanning is performed on the sample, and forming an array comprising an element content, an ultrasonic signal amplitude, and the residual stress of each detection point to obtain an element distribution, an ultrasonic defect detection, and a residual stress at a scan area.

According to the second aspect of the disclosure, there is also provided a laser opto-ultrasonic composite detection system for simultaneously detecting elements, defects and residual stress, which includes an excitation unit, a spectral detection unit, an ultrasonic detection unit and an analysis control unit. Among them, the analysis control unit includes a digital delayer generator, a computer and a sample stage.

The digital delayer generator is controlled by the connecting computer. The sample stage includes a high-precision 3D displacement platform and a sample holder. The sample holder is configured to hold the sample to be tested, and the sample holder is fixed on the high-precision 3D displacement platform. The high-precision 3D displacement platform is movable along the X, Y, and Z directions to realize the position adjustment of the sample to be analyzed in the three-dimensional direction. The high-precision 3D displacement platform is electrically connected to the digital delayer generator. The computer is integrated with an element analysis module, a defect analysis module, and a stress analysis module. The element analysis module is designed to gather and process spectral signals to obtain the spectral intensity of the target element. According to the relationship between the element content and the spectral intensity, the element content information is obtained. Furthermore, an image is formed according to the spatial position for the element information at the acquisition area, thereby obtaining the element distribution. The defect analysis module is configured to gather and process the ultrasonic signal, filter and optimize the signal, and obtain the ultrasonic amplitude at the acquisition area. Furthermore, an image is formed according to the spatial position for the signal amplitude at the acquisition area, thereby obtaining a defect distribution map. The stress analysis module is configured to gather and process the ultrasonic signal, filter and optimize the signal, and extract the ultrasonic time of flight. Then, the ultrasound velocity is obtained according to the time-of-flight, and the residual stress is obtained according to the ultrasound velocity. Furthermore, an image is formed according to the spatial position for the residual stress at the acquisition area, thereby obtaining a residual stress distribution. The excitation module includes a pulse laser and a series of optical path systems. The pulse laser is configured to emit pulse lasers to excite plasma from the sample to generate plasma and ultrasonic waves simultaneously. The optical path system includes a number of reflection mirrors and focusing mirrors and other optical devices for shaping and filtering the pulse laser, and the pulse laser is incident onto the sample to be tested, then the plasma light is incident onto the spectrum acquisition probe. The ultrasonic detection module is configured to detect ultrasonic waves to obtain information about defects and residual stress in the sample to be tested. The spectrum detection module is configured to detect the plasma emission spectra to obtain information about the elements in the sample to be tested. The excitation module, spectrum detection module, ultrasonic detection module and analysis control module jointly realize the function of scanning the element distribution, structural defects and residual stress distribution of the sample. The detection result contains a multi-dimensional distribution of element distribution, material defects and residual stress distribution information.

Further, the excitation module includes a pulse laser, a total reflection mirror, a half mirror and a focusing objective lens. The half mirror and the focusing objective lens are located on the horizontal optical path. The transmission surface of the half mirror forms a 45° angle with the horizontal optical path. The total reflection mirror is installed above the half mirror and forms a 90° angle with the half mirror. The laser exit of the pulse laser and the total reflection mirror are on the same horizontal optical path and form a 45° angle.

Further, the spectrum detection module includes a spectrum acquisition probe, a spectrum acquisition probe focusing lens, a spectrometer, and an enhanced charge-coupled device. Among them, the spectrum acquisition probe, the probe focusing lens, and the focusing objective lens as well as the half mirror are located on the same horizontal optical path. The spectrum acquisition probe and the spectrometer are connected through an optical fiber, the enhanced charge-coupled device is installed on the spectrometer, and the spectrometer is electrically connected with the computer.

Further, the ultrasonic detection module includes an ultrasonic detector and an acquisition card, the ultrasonic detector is electrically connected to the acquisition card, and the acquisition card is simultaneously connected to the computer and the digital delayer generator.

Further, the pulse laser and the spectrometer are simultaneously electrically connected to the digital delayer generator.

Further, the ultrasonic detector comprises a contact type and a non-contact type, and is disposed at places according to the detection target.

Further, the digital delay generator is configured to control the pulse laser to emit laser at the set time, control the spectrometer to perform the acquisition work at the set time, and also control the acquisition card to perform the detection work at the set time. The digital delay generator is mainly configured for timing control, so that the pulse laser, spectrometer, and acquisition card are electrically connected thereto and controlled, which achieves the goal that can perform operation at the set time, thereby optimizing the acquisition efficiency without conflict.

In the disclosure, the use of a computer-controlled high-precision 3D displacement platform can realize the three-dimensional movement of the sample under analysis, and the automatic acquisition movement can be completed through the digital delayer generator in the analysis control module and computer control.

In the disclosure, the excitation module and the spectrum detection module share the same optical path. The plasma emission spectra excited by the excitation module is received by the spectrum detection module, and transmitted to the computer for analysis and imaging, thereby obtaining the atomic emission spectrum at the laser ablation area. The acquisition time is controlled by a digital delay generator, and the pulse laser and acquisition card are also controlled by the digital delay generator to control their start sequence and delay. The placement position of the ultrasonic detector is adjusted according to the detection requirements. This laser opto-ultrasonic composite detection system for elements, defects and residual stress adopts a single excitation laser source to simultaneously excite spectral information and ultrasonic information. Through the acquisition and processing of spectral detection equipment and ultrasonic detection equipment, the elements, defects and residual stress information of the object to be tested can be obtained simultaneously. This technology realizes the exploration of the corresponding relationship among element composition, structural defects and residual stress distribution, which can be adopted for qualitative and quantitative composite analysis of element content, structural defects and residual stress of various materials.

In conclusion, compared with the current technologies, the above technical solutions conceived by the disclosure can achieve the following advantageous effects.

(1) Currently, the element composition, metallurgical defects and stress deformation of the manufactured components are detected separately in the industry, and only a single index test can be detected. The most outstanding feature of the disclosure is to make up for the above shortcomings. By exciting the sample through an excitement laser beam, gathering optical signals and performing comprehensive analysis on ultrasonic signal, the comprehensive detection results of material elements, defects and residual stress can be obtained simultaneously. The disclosure not only can overcome the shortcomings of time-consuming single test, complicated process and multiple treatments on sample, but also can provide a new and fast detection method for in-situ, fast, multi-parameters and multi-function detection on materials.

(2) The second prominent feature of the disclosure is that multi-dimensional detection results can be obtained. The optical signal and ultrasonic signal are obtained by performing high-precision laser scanning on the sample. The surface element distribution, surface/internal defect distribution and surface/internal residual stress of the sample can be obtained through signal processing and analysis. Finally, the multi-functional composite characterization can be performed intuitively on the sample to realize visualization of material detection and analysis.

(3) The sample preparation for the disclosure is simple or even no sample preparation is required. The disclosure causes no damage to samples and no pollution to human body and environment so that can be applied to industrial environment, integrated to replace existing element analysis and ultrasonic detection systems, and has broad application prospects in aerospace, machinery manufacturing, metallurgy and chemical industry and so on.

Figure 1:
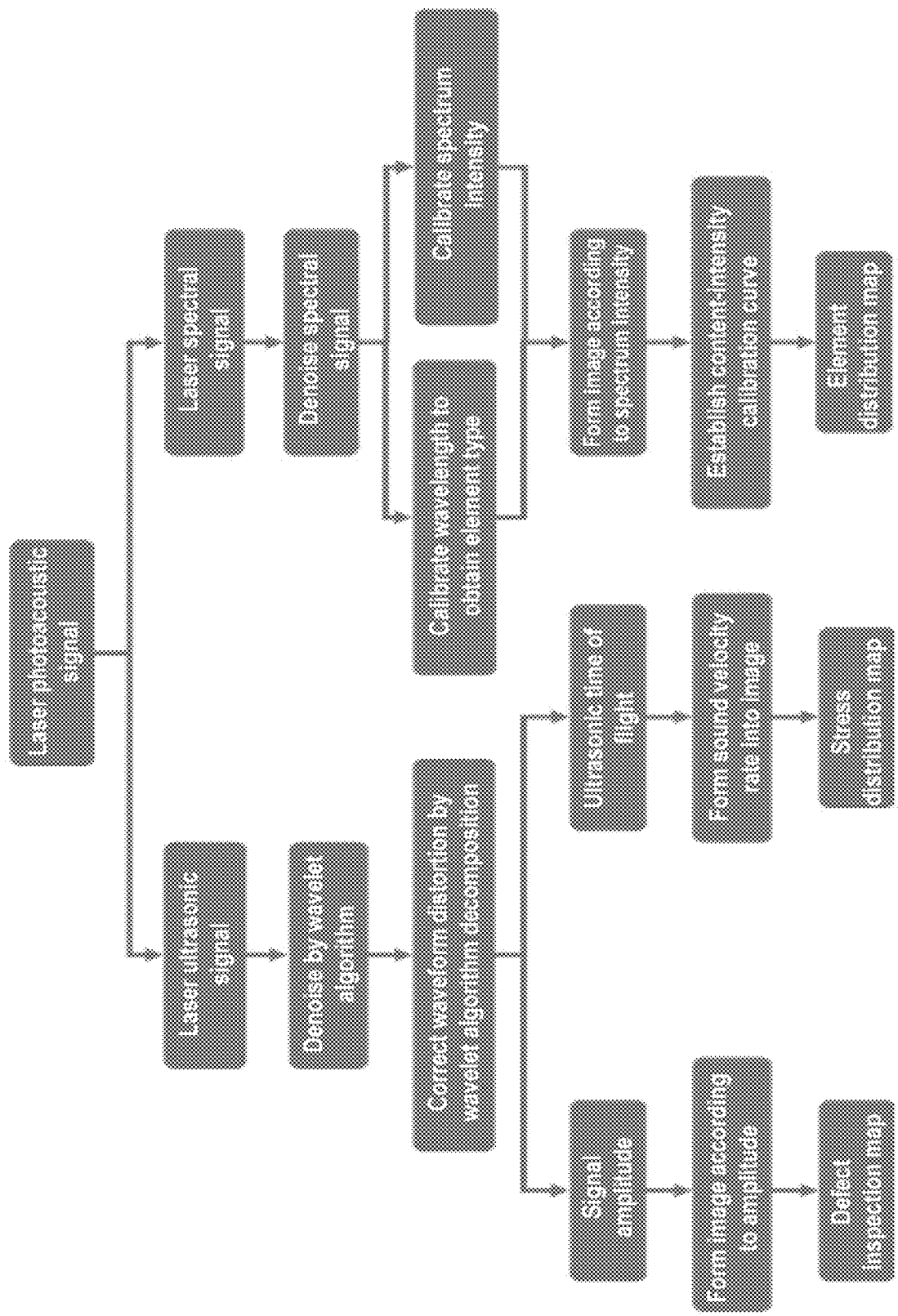
FIG. 1 is a schematic diagram of an opto-ultrasonic signal processing method in an embodiment of the disclosure.

Among them, 1. Computer; 2. Acquisition card; 3. Ultrasonic detector; 4. 3D displacement platform; 5. Digital delay generator; 6. Pulse laser; 7. Sample to be tested; 8. intensified charge-coupled device (ICCD); 9. Spectrometer; 10. Total reflection mirror focusing objective lens; 11. Spectrometer acquisition probe; 12. Spectrometer acquisition probe focusing lens; 13. Half mirror; 14. Focusing objective lens; 15. Sample holder.

DETAILED DESCRIPTION OF EMBODIMENTS

In order to make the objectives, technical solutions and advantages of the disclosure clearer, there is further description of the disclosure in detail with reference to the accompanying drawings and embodiments. It should be understood that the specific embodiments described here are only used to explain the disclosure, but not to limit the disclosure. In addition, the technical features involved in the various embodiments of the disclosure described below can be combined with each other as long as they do not conflict with each other.

The disclosure provides a photo acoustic composite detection technology using laser as a light source to realize simultaneous detection of element composition, structural defects and residual stress distribution.

There are following steps included in the method for simultaneously detecting elements, defects and residual stress provided in the disclosure.

S1: A high-energy pulse laser is adopted to ablate the surface of the target to form ultrasonic waves and plasma.

S2: Ultrasonic signals and spectral signals are gathered. Specifically, ultrasonic signals are acquired in a wide frequency domain through an ultrasonic detector.

S3: The amplitude of the head wave in the ultrasonic signal is analyzed to determine whether there is a defect in the detection area, and the signal amplitude at the defect area is lower, which is used as the basis for detection.

By calculating the propagation time of ultrasonic wave, the velocity of sound is obtained. Based on acoustoelastic theory, the following is obtained.

$$\sigma = \frac{1}{K}\left(\frac{V_{IZ} - V_{Io}}{V_{Io}}\right)$$

Where the stress $\sigma$ is related to sound velocity change rate $$\frac{V_{IZ} - V_{Io}}{V_{Io}},$$

and the sound velocity change rate is obtained by comparing the stress sound velocity $V_{IZ}$ and the stressless sound velocity $V_{Io}$ at the measured area. The acoustic elasticity coefficient K is measured by stretching the sample, and the stress of the material is obtained by measuring the velocity of sound.

For the optical signal of the plasma, the high-resolution spectrometer is adopted to perform light-splitting on the signal, and then the signal after light-splitting is subjected to photoelectrical conversion and analysis through highly sensitive ICCD, thereby obtaining atom-induced breakdown spectrum, and the wavelength information of the spectrum characterizes the element type of the substance.

The principle is that high-energy pulse laser is adopted to ablate the surface of the target, the material at the ablation area vaporizes, the atoms, molecules and other particles in the vaporized substance absorb energy and release ions, and the ions continue to absorb energy to form high-temperature and high-density plasma plume that contains atoms, molecules, ions and free electrons. The plasma plume absorbs laser energy and expands outwards, generating shock waves. The shock wave quickly expands and propagates to the surface of the sample, excites the phonons in the sample to vibrate, and generates high-frequency ultrasonic waves. In the meantime, the particles in the plasma absorb laser energy to produce electronic transitions and radiate photons with specific wavelengths and reflecting material information.

Figure 2:
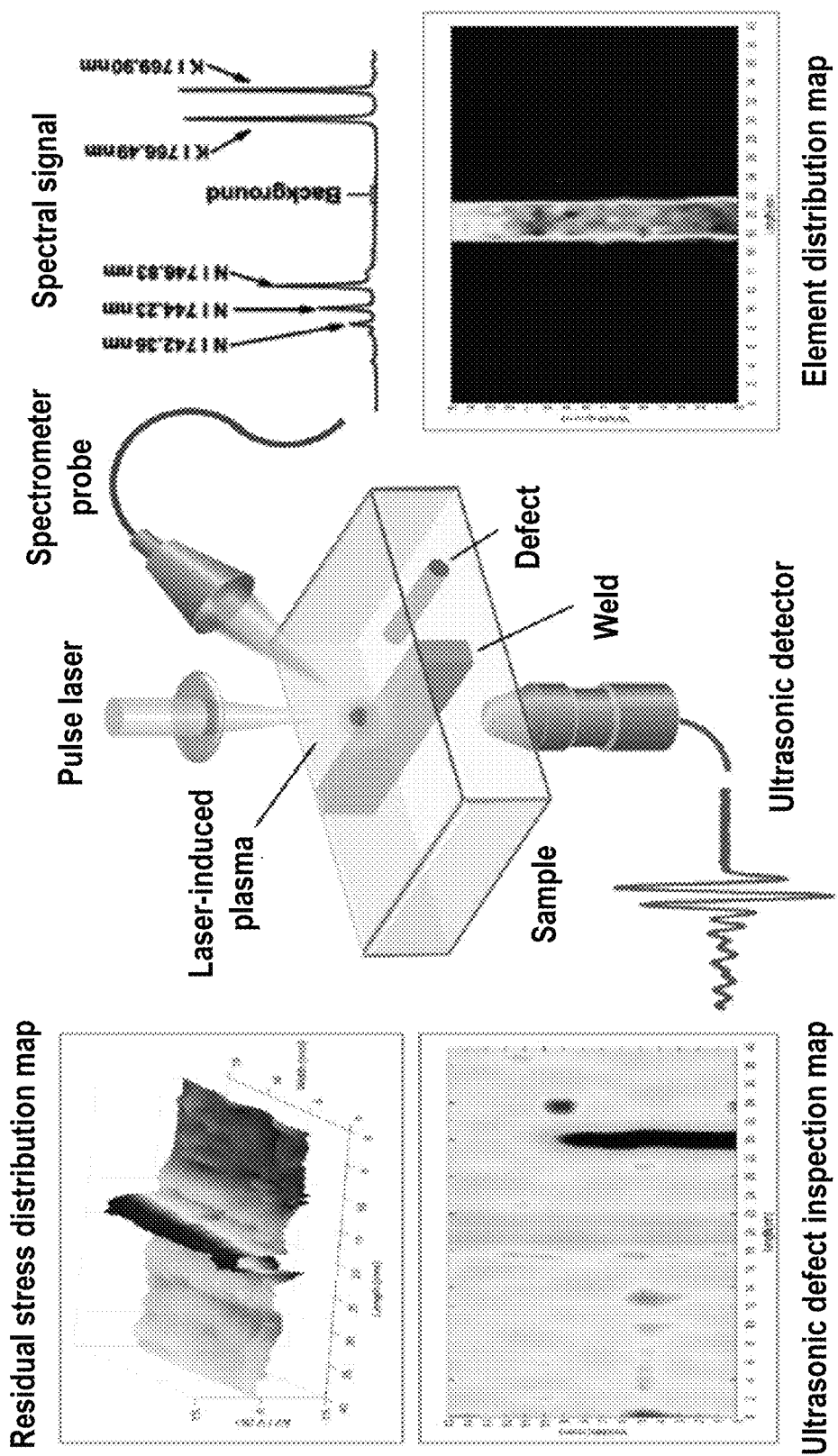
FIG. 2 is a schematic diagram of laser excitation and detection in an embodiment of the disclosure.

FIG. 1 is a schematic diagram of a photo acoustic signal processing method in an embodiment of the disclosure. FIG. 2 is a schematic diagram of laser excitation and detection in an embodiment of the disclosure. As shown in the two figures, the ultrasonic signal is gathered in a wide frequency domain through a high-sensitivity ultrasonic detector. After obtaining the ultrasonic signal, wavelet analysis is used to denoise the signal and calibrate waveform distortion to improve the signal-to-noise ratio. Then, the amplitude of the ultrasonic signal head wave is extracted to determining whether there is a defect in the detected area. By identifying the head wave and the first echo waveform, the ultrasonic time of flight is calculated, and then the thickness of sample is measured, so that the sound velocity is obtained. Based on acoustoelastic theory, the following is obtained.

$$\sigma = \frac{1}{K}\left(\frac{V_{IZ} - V_{Io}}{V_{Io}}\right)$$

It can be known that the magnitude of stress (σ) of a substance is related to sound velocity change rate $$\frac{V_{lZ} - V_{lo}}{V_{lo}},$$

and the sound velocity change rate is obtained by comparing the stress sound velocity $V_{lZ}$ and the stressless sound velocity $V_{lo}$ at the measured area. The acoustic elasticity coefficient (K) is measured by stretching the sample, and the stress of the material is obtained by measuring the velocity of sound.

FIG. 1 and FIG. 2 further show that, for the optical radiation signal of the plasma, the high-resolution spectrometer is adopted to perform light-splitting on the signal, and then the signal after light-splitting is subjected to photoelectrical conversion and imaging through highly sensitive ICCD, thereby obtaining laser-induced breakdown spectrum. First, wavelet and other algorithms are adopted to denoise the spectrum, and secondly the wavelength shift of the spectrum and the self-reversal of the spectrum caused by the self-absorption are calibrated to obtain the accurate wavelength information of the spectrum, so as to analyze the element type of the substance. The accurate spectrum intensity is obtained through spectral line fitting, finally, the content of elements corresponding to the excitation site is established through the calibration curve method.

Figure 3:
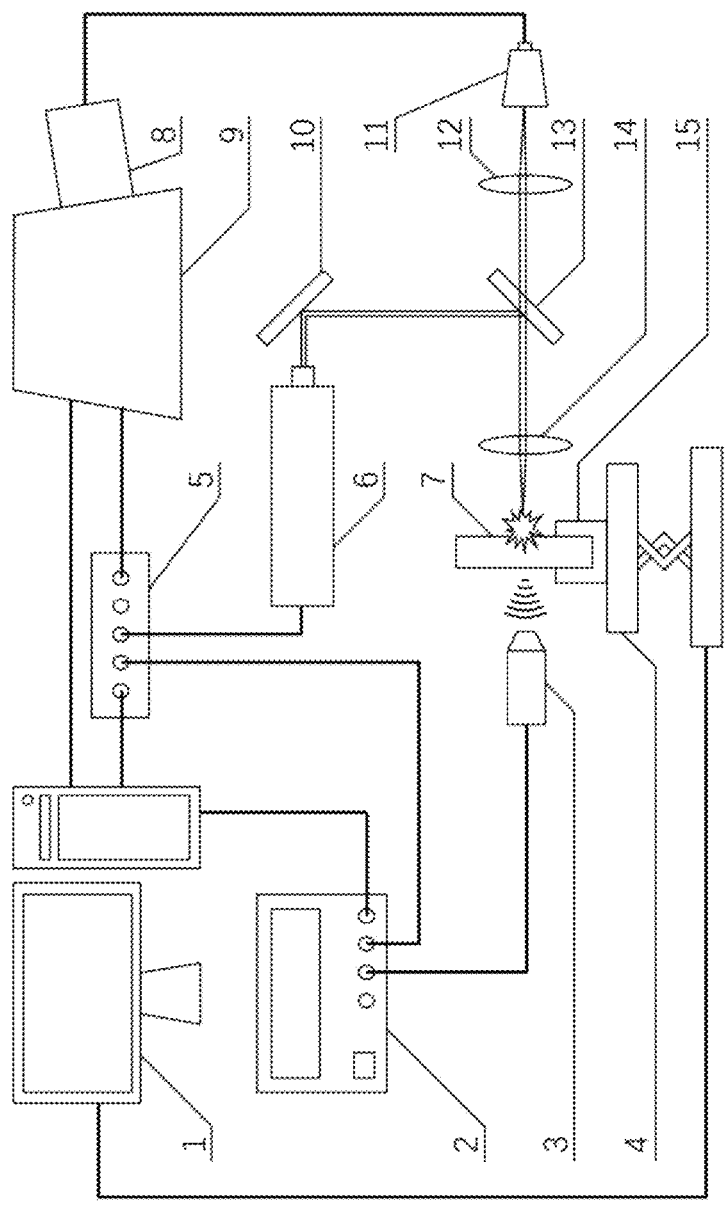
FIG. 3 is a structural schematic diagram of a laser-photo acoustic composite detection system for elements, defects, and residual stress in an embodiment of the disclosure.

FIG. 3 is a structural schematic diagram of a laser-photoacoustic composite detection system for elements, defects, and residual stress in an embodiment of the disclosure. FIG. 3 shows that a focusing objective lens 14, a half mirror 13 and a spectrometer acquisition probe focusing lens 12 are located on the same horizontal optical path. The transmission surface of the half mirror 13 forms a 45° angle with a substrate and also forms a 45° angle with the horizontal optical path. The laser exit of the pulse laser 6 and the total reflection mirror 10 are sequentially located on the reflection optical path of the half mirror 13. The total reflection mirror 10 and the half mirror 13 are perpendicular to each other. The distance among the total reflection mirror 10, the half mirror 13, the focusing objective lens 14, and the spectrometer acquisition probe focusing lens 12 can be adjusted horizontally and vertically by connecting a screw rod and a guide rail.

The spectrometer acquisition probe 11 is located on the right side of the spectrometer acquisition probe focusing lens 12, which is connected to the spectrometer 9 through an optical fiber. An intensified charge-coupled device (ICCD) 8 is installed on the spectrometer 9 connected to the computer 1 through a cable. The high-precision 3D displacement platform 4 can realize precise movement in the horizontal X, Y directions and vertical Z direction by driving the screw rod and guide rails through the motor in the horizontal and vertical direction respectively. The high-precision 3D displacement platform 4 can realize precise movement in the vertical Z direction by driving the screw rod and guide rails through the motor in the vertical direction. The motors in the horizontal direction and the vertical direction are operated simultaneously to form an x-y-z three-dimensional motion system. The sample to be tested 7 is placed on the sample holder 15 which is fixed on the high-precision 3D displacement platform 4. The high-precision 3D displacement platform 4 is connected to the computer 1 through a control cable to precisely control its position by the computer.

The ultrasonic detector 3 and the pulse laser are separated on both sides of the sample or placed on the same side of the sample. The ultrasonic detector 3 is connected to the acquisition card 2 through a connecting wire which is connected to the computer 1 through a cable.

The digital delay generator 5 is mainly configured to control the pulse laser 6 to emit laser, control the spectrometer 9 to gather and control the acquisition card 2 to gather the ultrasonic waveform. There is a cable connected between the digital delay generator 5 and the pulse laser 6, the spectrometer 9, the acquisition card 2 and the computer 1.

The pulse laser 6 is mainly used to emit a pulse laser beam to ablate the surface of the sample to be tested 7 to excite plasma and ultrasonic waves. The half mirror 13 is used to reflect the pulse laser beam and the radiation spectrum generated by the plasma excited by the sample to be tested 7. The total reflection mirror 10 is used to form an optical path reflection structure with the half mirror 13 to totally reflect the pulse laser beam to adjust the optical path and facilitate information acquisition.

The spectrometer acquisition probe 11 is located exactly on the right side of the spectrometer acquisition probe focusing lens 12, and gathers information by adjusting the position in the space as well as pulse laser beam focusing. The spectrometer acquisition probe 11 adopts coaxial acquisition, which greatly improves the stability of acquiring spectrum information. The acquired information is transmitted to the spectrometer 9 through optical fiber coupling.

The main function of the intensified charge-coupled device (ICCD) 8 is: together with the spectrometer 9, constitute the light-splitting system and detector of the sample, configured to collect the emission spectral signal generated by the plasma on the surface of the object to be tested, and form the spectral line of various elements obtained through the plasma radiation light decomposed by the spectrometer 9 into images, so as to carry out qualitative and quantitative analysis of sample elements.

The high-precision 3D displacement platform 4 is used to control the motor in horizontal X, Y direction and the motor in the vertical Z direction to work together by receiving the control signal transmitted by the control cable. Specifically, the motor in the horizontal Y direction is adjusted to rotate forward and reverses to control the platform to move left and right. The defocus is adjusted with the focusing objectively lens 14 involved. The motor in the vertical Z direction is adjusted to rotate forward and reverses to control the platform to ascend and descend. The motor in the horizontal X direction is adjusted to rotate forward and reverses to control the platform to move laterally forward and backward. The cooperative movement of the platform in the Z direction and X direction can realize surface scanning acquisition on the sample to be tested 7.

The function of the ultrasonic detector 3 is to detect the ultrasonic signal excited by the sample to be tested 7, and convert the acoustic signal into an electric signal, which is transmitted to the acquisition card 2 through a cable. The acquisition card 2 transmits the electrical signal to the computer 1 through the cable for real-time imaging and analysis.

The computer 1 can be a desktop computer or a notebook computer connected to the digital delay generator 5, the spectrometer 9, the high-precision 3D displacement platform 4, and the acquisition card 2 through a USB interface, a cable or a network cable. The function of computer software includes automatic scanning, searching for atomic spectrum peaks, qualitative identification, quantitative conversion calculation and acoustic wave information processing conversion model.

The computer is integrated with an element analysis module, a defect analysis module, and a stress analysis module. The element analysis module is configured to gather and process the spectral signal to obtain the spectral intensity of the target element, and obtain the element content information according to the relationship between the element content and the spectral intensity. Furthermore, an image is formed according to the spatial position for the element information at the acquisition area, thereby obtaining the element distribution. The defect analysis module is configured to gather and process the ultrasonic signal, filter and optimize the signal, and obtain the ultrasonic amplitude at the acquisition area. Furthermore, an image is formed according to the spatial position for the signal amplitude at the acquisition area, thereby obtaining a defect distribution. The stress analysis module is configured to gather and process the ultrasonic signal, filter and optimize the signal, and extract the ultrasonic time of flight. Then, the ultrasound velocity is obtained according to the time-of-flight, and the residual stress is obtained according to the ultrasound velocity. Furthermore, an image is formed according to the spatial position for the residual stress at the acquisition area, thereby obtaining a residual stress distribution map.

The laser-photoacoustic composite detection method for detecting elements, defects and residual stress by using the above system includes the following steps. Laser is adopted as an excitation source to excite the sample to be tested to simultaneously generate ultrasonic waves and plasma so that acoustic and optical signals are gathered to simultaneously obtain the element, defect and residual stress information of the material. In actual application, the line and surface scanning analysis are performed on the sample through laser to simultaneously obtain the element, defect and residual stress information of the object to be tested under the premise of slight damage or even no damage to the sample.

The device of the disclosure will be further described in detail below in conjunction with specific embodiments.

Embodiment 1

Now take the detection of arc additive manufacturing samples as an example to illustrate the application process of the laser-photoacoustic composite detection system of the disclosure. The specific operation steps are as follows.

(1) Nd:YAG Q-switched laser is adopted as the pulse laser 6 with emission wavelength of 532 nm, pulse width of 8 ns, and adjusted pulse energy of about 50 mJ. A water-immersed ultrasonic probe is adopted as the ultrasonic detector 3 with a center frequency of 20 MHz. The model number of the digital delay generator 5 is DG535, and its delay resolution is 5 ps.

(2) The welding sample is placed on the sample holder 15. The scanning surface is facing the light exit of laser, the position of the 3D displacement platform 4 in the Y-axis direction and the position of the focusing objective lens 14 are adjusted such that the pulse laser beam focuses at the focal position. The position of the high-precision 3D displacement platform 4 along the X-Z axis is adjusted to the starting point in the scan area.

The distance between the spectrometer acquisition probe 11 and the spectrometer acquisition probe focusing lens 12 is adjusted so as to achieve an optimal acquisition condition. The ultrasonic detector 3 is placed on the backside of the sample, and a couplant is applied on the detection surface to couple the detection surface with the backside of the welding sample to make it satisfy the detection conditions and fix its position.

After the scan area of the welding sample is aligned and locked, the computer 1 is adopted to control the digital delay generator 5 and the high-precision 3D displacement platform 4. The three devices controlled by the digital delay generator 5 and the high-precision 3D displacement platform controlled by the computer start to operate in sequence. The operation sequence is pulse laser 6, spectrometer 9, acquisition card 3, and high-precision 3D displacement platform 4.

(3) The pulse laser 6 is activated to emit a pulse laser beam. The direction of the optical path of the pulse laser beam changes downward through the total reflection mirror 10, then the direction of the optical path direction changes to the left through the half mirror 13, and focuses on the detection surface of the sample to be tested 7 for ablation through the focusing objective lens 14.

At the focused and ablation area, the substance being tested absorbs energy and evaporates, a large amount of the substance is transformed into a plasma state. The plasma generates an energy level transition and emits a light signal, which is gathered by the spectrometer acquisition probe 11 through the coaxial acquisition optical path of the focusing objective lens 14→half mirror 13→the spectrometer acquisition probe focusing lens 12. Specifically, the half mirror 13 totally reflects pulse laser and transmits the plasma radiation light to pass through completely.

The spectrometer 9 detects and analyzes the atomic and ion spectrum excited by the laser, which is transmitted to the intensified charge-coupled device (ICCD) 8 receiving the timing signal controlled by the digital delay generator 5, then its spectrum acquisition switch is turned on to ideal time-delay signal acquisition on the spectral signal, which is amplified and converted into an electrical signal transmitted to the computer 1 to obtain the spectrum of the plasma.

While plasma is generated through laser ablation, ultrasonic waves are also generated inside the sample to be tested 7 due to pulse laser excitation. The ultrasonic waves are gathered and converted into electrical signals by the ultrasonic detector 3 coupled to the other side of the welding sample. Then the electrical signals are transmitted to the corresponding module of the computer 1 through the acquisition card 2 for processing to obtain the defect and residual stress information of the welding sample.

(4) After completing the acquisition at one acquisition point, the high-precision 3D displacement platform 4 moves to the next acquisition position, and the above steps are repeated until the acquisition work is completed at all acquisition points.

After the acquisition work is completed at all acquisition points, the spectrum information at the acquisition points is mapped to the coordinates of the scanning surface one by one through the processing module of the computer 1, by analyzing the content of the preset elements quantitatively, a surface scanning element content distribution is illustrated with color difference. Meanwhile, the detected ultrasound amplitude and velocity information are combined to form a surface scanning map of defect distribution and a residual stress distribution, finally, a distribution map containing the elements, defects and residual stress of the object to be tested is obtained.

Through the above steps, the accurate qualitative and accurate quantitative analysis of composition surface scanning, structural defects and residual stress distribution are completed based on LIBS and laser ultrasonic technology.

When it is necessary to detect other positions of the sample, the comprehensive scanning analysis of different parts of the sample is completed by re-directing the scanning plane with the x, y, and z three-axis linkage control.

When performing detection on the sample, firstly, the scanning plane should be determined and the scanning path of the pulse laser should be compiled according to the surface topography and detecting requirements of the sample. The digital delay generator 5 should be utilized to control the timing coordination of each functional unit to obtain the optimal acquisition effect.

The disclosure provides a laser-photoacoustic composite detection system for elements, defects and residual stress in material, which adopts a single pulse laser as the excitation light source to ablate the sample to be tested and excite plasma and ultrasonic waves. On the one hand, a spectrometer is adopted to gather the emission spectrum of the plasma. Also, on the other hand, an ultrasonic detector is adopted to simultaneously detect the ultrasonic waves generated by laser excitation, thus achieving detection and analysis of elements, defects, and residual stress of the sample simultaneously.

Those skilled in the art can easily understand that the above descriptions are only preferred embodiments of the present disclosure but not intended to limit the present disclosure. Any modification, equivalent replacement and improvement, etc. made within the spirit and principle of the present disclosure should fall within the protection scope of the present disclosure.

What is claimed is:

1. A method for simultaneously detecting elements, defects and residual stress, comprising the following steps:
   S1: adopting a high-energy pulse laser to ablate a surface of a sample to generate a plasma, then generate a laser ultrasonic wave and a plasma emission optical,
   S2: acquiring a laser ultrasonic signal and the plasma emission optical, specifically, acquiring the laser ultrasonic signal in a wide frequency domain through an ultrasonic detector, wherein the ultrasonic detector and the pulse laser are separated on opposite sides of the sample, wherein a center frequency of the ultrasonic detector is 20 MHZ,
   S3: analyzing an amplitude of a head wave in the laser ultrasonic signal to determine whether there is a defect in a detection area, and a laser ultrasonic signal amplitude is lower at a defect area, which is used as a basis for detection,
   by calculating a propagation time of the ultrasonic wave, a velocity of sound is obtained, based on acoustoelastic theory, the following is obtained:

$$\sigma = \frac{1}{K}\left(\frac{V_{lZ} - V_{lo}}{V_{lo}}\right)$$

wherein a magnitude of a stress σ of a substance is related to a sound velocity change rate $$\frac{V_{lZ} - V_{lo}}{V_{lo}},$$

and the sound velocity change rate is obtained by comparing a stress sound velocity $V_{lZ}$ and a stressless sound velocity $V_{lo}$ at a measured area, an acoustic elasticity coefficient K is measured by stretching the sample, and the stress of the substance is obtained by measuring the velocity of sound,
   for the plasma emission optical, a high-resolution spectrometer is adopted to perform light-splitting on the plasma emission optical, and then the plasma emission optical after light-splitting is subjected to photoelectrical conversion and analysis through intensified charge-coupled device (ICCD), thereby obtaining an atom-induced breakdown spectrum, and wavelength information of the spectrum characterizes an element type of the substance.

2. The method for simultaneously detecting elements, defects and residual stress according to claim 1, wherein the method further comprises step S4:
   performing surface scanning on the sample, and forming an array comprising an element content, the laser ultrasonic signal amplitude, and the residual stress at each detection point to obtain an element distribution map, an ultrasonic defect detection map, and a residual stress map at a scan area.

3. A device for realizing the method according to claim 1, wherein the device comprises an excitation module, a spectrum detection module, an ultrasonic detection module and an analysis control module, wherein
   the analysis control module comprises a digital delayer generator (DDG), a computer and a sample stage, the digital delayer generator is controlled by the computer, the sample stage comprises a high-precision 3D displacement platform and a sample holder holding the sample to be tested, which is fixed on the high-precision 3D displacement platform movable along X-, Y-, and Z-directions to realize position adjustment of the sample to be analyzed in three dimensions through electrically connection to the digital delayer generator,
   the computer is integrated with an element analysis module, a defect analysis module, and a stress analysis module,
   the element analysis module acquires and processes a spectral signal to obtain a spectral intensity of a target element, according to a relationship between the element content and the spectral intensity, element content information is obtained, and an image is formed according to a spatial position for the element information at an acquisition area, thereby obtaining the element distribution map,
   the defect analysis module acquires and processes the laser ultrasonic signal, and obtains the ultrasonic amplitude at the acquisition area by filtering and optimizing the laser ultrasonic signal, then an image is formed according to the spatial position for the laser ultrasonic signal amplitude at the acquisition area, thereby obtaining the defect distribution map,
   the stress analysis module acquires and processes the laser ultrasonic signal, and extract an ultrasonic time of flight by filtering and optimizing the laser ultrasonic signal, then the residual stress is obtained according to a sound propagation time change rate, and an image is formed according to the spatial position for the residual stress at the acquisition area, thereby obtaining the residual stress distribution map,
   the excitation module comprises a pulse laser and an optical path system, the pulse laser is configured to emit pulse laser, the pulse laser is configured to excite the sample to generate the plasma which excites the laser ultrasonic waves and laser-induced breakdown spectrum simultaneously, the optical path system comprises a number of reflection mirrors and focusing mirrors for shaping and filtering the pulse laser, and thereafter the pulse laser is incident onto the sample to be tested, the ultrasonic detection module detects the ultrasonic waves to obtain information about defects and residual stress in the sample to be tested, the spectrum detection module detects a plasma emission spectrum to obtain information about the elements in the sample to be tested.

4. The device according to claim 3, wherein the optical path system comprises a total reflection mirror, a half mirror and a focusing objective lens, the half mirror and the focusing objective lens are located on a horizontal optical path, a transmission surface of the half mirror forms a 45° angle with the horizontal optical path, the total reflection mirror is installed above the half mirror at a 90° angle, a light exit of the pulse laser and the total reflection mirror are on the same horizontal optical path at a 45° angle.

5. The device according to claim 4, wherein the spectrum detection module comprises a spectrum acquisition probe, a spectrum acquisition probe focusing lens, a spectrometer, and an enhanced charge-coupled device (ICCD), wherein the spectrum acquisition probe, the spectrum acquisition probe focusing lens, the focusing objective lens and the half mirror are located on the same horizontal optical path, the spectrometer acquisition probe and the spectrometer are connected through an optical fiber, the enhanced charge-coupled device is installed on the spectrometer electrically connected to the computer.

6. The device according to claim 5, wherein the ultrasonic detection module comprises the ultrasonic detector and an acquisition card (DAQ), the ultrasonic detector is electrically connected to the acquisition card which is simultaneously connected to the computer and the digital delayer generator, the pulse laser and the spectrometer are simultaneously electrically connected to the digital delayer generator, the ultrasonic detector is a contact type ultrasonic detector or a non-contact type ultrasonic detector.

7. The device according to claim 6, wherein the digital delay generator is configured to control the pulse laser to emit laser at a set time, control the spectrometer to perform an acquisition work at the set time, and also control the acquisition card to perform the detection work at the set time, the digital delay generator is mainly configured for timing control, so that the pulse laser, the spectrometer, and the acquisition card that are electrically connected thereto and controlled thereby can perform operation at the set time and do not conflict with each other.

8. A device for realizing the method according to claim 2, wherein the device comprises an excitation module, a spectrum detection module, an ultrasonic detection module and an analysis control module, wherein the analysis control module comprises a digital delayer generator (DDG), a computer and a sample stage, the digital delayer generator is controlled by the computer, the sample stage comprises a high-precision 3D displacement platform and a sample holder holding the sample to be tested, which is fixed on the high-precision 3D displacement platform movable along X-, Y-, and Z-directions to realize position adjustment of the sample to be analyzed in three dimensions through electrically connection to the digital delayer generator, the computer is integrated with an element analysis module, a defect analysis module, and a stress analysis module, the element analysis module acquires and processes a spectral signal to obtain a spectral intensity of a target element, according to a relationship between the element content and the spectral intensity, element content information is obtained, and an image is formed according to a spatial position for the element information at an acquisition area, thereby obtaining the element distribution map, the defect analysis module acquires and processes the laser ultrasonic signal, and obtains the ultrasonic amplitude at the acquisition area by filtering and optimizing the laser ultrasonic signal, then an image is formed according to the spatial position for the laser ultrasonic signal amplitude at the acquisition area, thereby obtaining the defect distribution map, the stress analysis module acquires and processes the laser ultrasonic signal, and extract an ultrasonic time of flight by filtering and optimizing the laser ultrasonic signal, then the residual stress is obtained according to a sound propagation time change rate, and an image is formed according to the spatial position for the residual stress at the acquisition area, thereby obtaining the residual stress distribution map, the excitation module comprises a pulse laser and an optical path system, the pulse laser is configured to emit pulse laser, the pulse laser is configured to excite the sample to generate the plasma which excites the laser ultrasonic waves and laser-induced breakdown spectrum simultaneously, the optical path system comprises a number of reflection mirrors and focusing mirrors for shaping and filtering the pulse laser, and thereafter the pulse laser is incident onto the sample to be tested, the ultrasonic detection module detects the ultrasonic waves to obtain information about defects and residual stress in the sample to be tested, the spectrum detection module detects a plasma emission spectrum to obtain information about the elements in the sample to be tested.

9. The device according to claim 8, wherein the optical path system comprises a total reflection mirror, a half mirror and a focusing objective lens, the half mirror and the focusing objective lens are located on a horizontal optical path, a transmission surface of the half mirror forms a 45° angle with the horizontal optical path, the total reflection mirror is installed above the half mirror at a 90° angle, a light exit of the pulse laser and the total reflection mirror are on the same horizontal optical path at a 45° angle.

10. The device according to claim 9, wherein the spectrum detection module comprises a spectrum acquisition probe, a spectrum acquisition probe focusing lens, a spectrometer, and an enhanced charge-coupled device (ICCD), wherein the spectrum acquisition probe, the spectrum acquisition probe focusing lens, the focusing objective lens and the half mirror are located on the same horizontal optical path, the spectrometer acquisition probe and the spectrometer are connected through an optical fiber, the enhanced charge-coupled device is installed on the spectrometer electrically connected to the computer.

11. The device according to claim 10, wherein the ultrasonic detection module comprises the ultrasonic detector and an acquisition card (DAQ), the ultrasonic detector is electrically connected to the acquisition card which is simultaneously connected to the computer and the digital delayer generator, the pulse laser and the spectrometer are simultaneously electrically connected to the digital delayer generator, the ultrasonic detector is a contact type ultrasonic detector or a non-contact type ultrasonic detector.

12. The device according to claim 11, wherein the digital delay generator is configured to control the pulse laser to emit laser at a set time, control the spectrometer to perform an acquisition work at the set time, and also control the acquisition card to perform the detection work at the set time, the digital delay generator is mainly configured for timing control, so that the pulse laser, the spectrometer, and the acquisition card that are electrically connected thereto and controlled thereby can perform operation at the set time and do not conflict with each other.

\* \* \* \* \*